(12) United States Patent
Höcker et al.

(10) Patent No.: US 11,408,757 B2
(45) Date of Patent: Aug. 9, 2022

(54) FLOW METER DEVICE ACCORDING TO THE VORTEX MEASURING PRINCIPLE, MEASURING TUBE FOR SAME, AND METHOD FOR MEASURING THE FLOW RATE OR THE FLOW SPEED OF A MEDIUM

(71) Applicant: Endress+Hauser Flowtec AG, Reinach (CH)

(72) Inventors: Ranier Höcker, Waldshut (DE); Christian Lais, Münchenstein (CH)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 0 days.

(21) Appl. No.: 16/958,936

(22) PCT Filed: Dec. 10, 2018

(86) PCT No.: PCT/EP2018/084192
§ 371 (c)(1),
(2) Date: Jun. 29, 2020

(87) PCT Pub. No.: WO2019/129479
PCT Pub. Date: Jul. 4, 2019

(65) Prior Publication Data
US 2020/0363243 A1    Nov. 19, 2020

(30) Foreign Application Priority Data
Dec. 29, 2017   (DE) .......................... 102017012066.8

(51) Int. Cl.
*G01F 1/32*     (2022.01)
*G01F 1/325*    (2022.01)

(52) U.S. Cl.
CPC ............ *G01F 1/3209* (2013.01); *G01F 1/325* (2022.01)

(58) Field of Classification Search
CPC ................. G01F 1/3218; G01F 1/3245; G01F 1/32–1/3287
See application file for complete search history.

(56) References Cited

U.S. PATENT DOCUMENTS 3,116,639 A     1/1964  Bird
10,175,075 B2 * 1/2019  Eriksson ................... G01F 1/66
(Continued)

FOREIGN PATENT DOCUMENTS

CA  2185922 A1  9/1995
CA  2985283 A1  12/2016
(Continued)

*Primary Examiner* — Erika J. Villaluna
(74) *Attorney, Agent, or Firm* — Christopher R. Powers; Endress+Hauser (USA) Holding Inc.

(57) ABSTRACT

A measuring tube for guiding a fluid for a flow meter device according to the vortex measuring principle, wherein the measuring tube has an inflow-side opening in an inflow-side end face and an outflow-side opening in an outflow-side end face, between which the measuring tube extends in the axial direction includes: a bluff body which is arranged in the measuring tube, wherein the bluff body functions to bring about a Kármán vortex street with a flow-rate-dependent vortex frequency when a fluid flows through the measuring tube; at least one vortex detector for detecting vortexes of the vortex street and for providing vortex-dependent signals; and a control valve between the vortex detector and the outflow-side end face and axially spaced apart from the vortex detector, which annularly constricts the flow cross-section of the measuring tube.

13 Claims, 2 Drawing Sheets

(56) References Cited

U.S. PATENT DOCUMENTS

| | | |
|---|---|---|
| 2011/0061469 A1 | 3/2011 | Maahs |
| 2013/0086994 A1 | 4/2013 | Noui-Mehidi |
| 2015/0276446 A1 | 10/2015 | Black et al. |

FOREIGN PATENT DOCUMENTS

| | | |
|---|---|---|
| CN | 101553714 A | 10/2009 |
| CN | 102645248 A | 8/2012 |
| DE | 3100462 A1 | 1/1982 |
| DE | 102007030700 A1 | 5/2009 |
| DE | 112010003671 T5 | 3/2013 |
| DE | 102013105363 A1 | 11/2014 |
| DE | 102013013476 A1 | 2/2015 |
| GB | 1416522 A | 12/1975 |
| JP | 1172362 A | 3/1999 |
| JP | 2010107406 A | 5/2010 |
| WO | 9831988 A1 | 7/1998 |

\* cited by examiner

FLOW METER DEVICE ACCORDING TO THE VORTEX MEASURING PRINCIPLE, MEASURING TUBE FOR SAME, AND METHOD FOR MEASURING THE FLOW RATE OR THE FLOW SPEED OF A MEDIUM

CROSS-REFERENCE TO RELATED APPLICATIONS

The present application is related to and claims the priority benefit of German Patent Application No. 10 2017 012 066.8, filed on Dec. 29, 2017, and International Patent Application No. PCT/EP2018/084192, filed on Dec. 10, 2018, the entire contents of which are incorporated herein by reference.

TECHNICAL FIELD

The present invention relates to a flow meter device according to the vortex measuring principle, a measuring tube for same, and a method for measuring the flow rate or the flow speed of a medium.

BACKGROUND

A generic flow meter device is described, for example, in "Durchfluss-Handbuch," 4th edition, 2003, ISBN 3-9520220-3-9, pg. 103 ff. Generic flow meter devices are based on the fact that vortexes are shed alternately from both sides of a bluff body around which a fluid flows in a pipeline and form what is known as a Kármán vortex street, wherein the vortexes lead to periodic pressure fluctuations which are to be detected with a vortex detector. For a concrete measuring arrangement, the shedding frequency of the vortexes is substantially proportional to the flow speed and the Strouhal number, a dimensionless number. The flow speed or the volumetric flow rate can thus be ascertained in a simple manner by ascertaining the vortex frequency.

Due to the measuring principle, a pressure loss occurs at the bluff body, which in the unfavorable case can lead to undershooting of the vapor pressure of a liquid medium in the region of the vortex detector. In this case, a reliable measurement of the flow is no longer possible.

SUMMARY

The object of the present invention is, therefore, to find a remedy. The object is achieved according to the invention by the measuring tube according to independent claim 1, the flow meter device according to independent claim 6, and the method according to independent claim 7.

The measuring tube according to the invention for guiding a fluid for a flow meter device according to the vortex measuring principle has an inflow-side opening in an inflow-side end face of the flow meter device and an outflow-side opening in an outflow-side end face of the meter device, between which the measuring tube extends in the axial direction;

a bluff body which is arranged in the measuring tube, wherein the bluff body functions to bring about a Kármán vortex street with a flow-rate-dependent vortex frequency when a fluid flows through the measuring tube;

at least one vortex detector for detecting vortexes of the vortex street and for providing vortex-dependent signals;

characterized in that the flow meter device has a control valve, between the vortex detector and the outflow-side end face of the flow meter device and axially spaced apart from the vortex detector, which annularly constricts the flow cross-section of the measuring tube.

In a development of the invention, the control valve has a flow resistance which is not less than 50%, for example not less than 75%, further for example less than 90%, especially, not less than 95%, of the flow resistance of the flow meter device between the inflow-side end face and the vortex detector.

In a development of the invention, the control valve has a minimum flow cross-sectional area which is not more than one and a half times, for example not more than one and one-fourth times and, especially, not more than one and one-tenth times the minimum flow cross-sectional area in the region of the bluff body.

In a development of the invention, the measuring tube has a first diameter between the vortex detector and the control valve at a first axial position, wherein at a second axial position, the control valve has a second diameter that is smaller than the first diameter by at least one tenth, wherein a quotient formed from the difference between the first diameter and the second diameter on the one hand and the difference between the first axial position and the second axial position is not less than two, for example not less than four and, especially, not less than eight.

In a development of the invention, the control valve is axially spaced apart from the vortex detector, wherein the axial distance is, for example, not less than half the diameter of the measuring tube between the vortex detector and the control valve, especially, not less than one diameter.

The flow meter device according to the invention comprises a measuring tube according to the invention and an operating and evaluation circuit which is configured to determine a vortex frequency on the basis of the signals of the vortex detector and a flow rate measurement value as a function of the vortex frequency.

The method according to the invention relates to measuring the flow rate or flow speed of a medium with a flow meter device according to the vortex measuring principle, which flow meter device comprises: a measuring tube for guiding a fluid, wherein the measuring tube has an inflow-side opening in an inflow-side end face of the flow meter device and an outflow-side opening in an outflow-side end face of the meter device, between which the measuring tube extends in the axial direction; a bluff body which is arranged in the measuring tube, wherein the bluff body functions to bring about a Kármán vortex street with a flow-rate-dependent vortex frequency when a fluid flows through the measuring tube; at least one vortex detector for detecting vortexes of the vortex street and for providing vortex-dependent signals; an evaluation unit which is configured to determine a vortex frequency on the basis of the signals and a flow rate measurement value as a function of the vortex frequency; wherein the flow meter device has a control valve, between the vortex detector and the outflow-side end face of the flow meter device, which annularly constricts the flow cross-section of the measuring tube; wherein a difference between the static pressure at the inflow-side end face and the static pressure at an axial position halfway between the bluff body and the control valve is not more than two thirds, especially, not more than half of the difference between the static pressure at the inflow-side end face and the static pressure downstream of the control valve at the outflow-side end face.

In a development of the invention, the medium has a vapor pressure, wherein the static pressure at the axial position halfway between the bluff body and the control valve is not less than one and a half times the vapor pressure of the medium.

In a development of the invention, the difference between the static pressure at the inflow-side end face and the static pressure at the outflow-side end face is not less than 20% of the static pressure at the outflow-side end face.

In a development, the invention relates to measuring tubes and flow meter devices for filling plants for filling beverages and flowable foodstuffs.

BRIEF DESCRIPTION OF THE DRAWINGS

The invention will now be explained on the basis of the exemplary embodiments shown in the drawings. Shown are.

DETAILED DESCRIPTION

Figure 1:
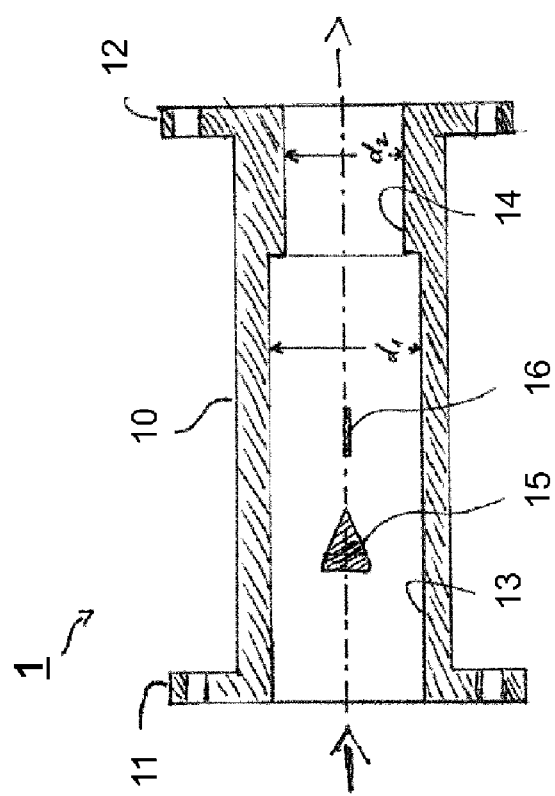
FIG. 1 shows a schematic longitudinal view through a first exemplary embodiment of a flow meter device according to the present disclosure in a top view.

The first exemplary embodiment of a flow meter device 1 according to the invention shown in FIG. 1 comprises a measuring tube 10 which has a first flange 11 on the inflow side and a second flange 12 on the outflow side for installation in a pipeline. The measuring tube 10 has on the inflow side a first cylindrical section 13 with a first inner diameter d1 and a on the outflow side a second cylindrical section 14 with a second inner diameter d2, wherein the transition between the first cylindrical section and the second section is designed as a radial step or radial jump. The flow meter device 1 furthermore has a bluff body 15 which is arranged in the first cylindrical section 13 and extends through the measuring tube perpendicularly to the longitudinal axis of the measuring tube 10 in order to generate a Kármán vortex street an a medium flowing through the measuring tube 10. In the flow direction below the bluff body 15, the flow meter device 1 has a vortex detector in the form of a sensor vane 16 which projects from the measuring tube wall into the measuring tube. The bluff body 15 and the sensor vane 16 are mirror-symmetrical with respect to a common measuring tube longitudinal plane in which the measuring tube longitudinal axis runs. The sensor vane 16 is mounted, for example, in a membrane, and deflections of the sensor vane caused by the vortexes are detected, for example, by means of (piezo) resistive or piezoelectric sensors or capacitive sensors (not shown here), especially, with a differential capacitor, wherein their signals are processed by an evaluation unit in order to ascertain a flow-rate-dependent vortex frequency and to calculate a flow rate value. Suitable holders for the sensor vane and signal evaluations are described, for example, in published patent applications DE10 2013 013 476 A1, DE 10 2013 105 363 A1, and WO 1998 031 988 A1.

The aforementioned reduction of the diameter between the first cylindrical section 13 and the second cylindrical section 14 achieves a throttling effect which, in a flowing medium, causes the static pressure in the first cylindrical section 13 in the region of the sensor vane 16 to be kept at a higher level than the static pressure in a pipeline which is connected to the measuring tube on the outflow side and has the diameter of the first pipeline section. In this way, the static pressure in the region of the sensor vane 16 can still be kept at a higher level, especially, above the vapor pressure of a component of a medium flowing in the pipe, despite a pressure drop at the bluff body 15 caused by the measuring principle. In this way, the outgassing of the component or cavitation is prevented, as a result of which a measurement continues to be possible and damage to the flow meter device 1 is avoided, even though the vapor pressure would be undershot, for example, in a pipeline connected to the measuring tube 10 on the outflow side with the first diameter or the diameter of an inflow-side pipeline. The diameter jump between the first cylindrical section and the second cylindrical section can be designed relative to the bluff body 15 such that a difference between the static pressure at the inflow-side end face and the static pressure at an axial position halfway between the bluff body 15 and the control valve 14 is not more than two thirds, especially, not more than half the difference between the static pressure at the inflow-side end face and the static pressure at the outflow-side end face downstream of the control valve when a pipeline with the first diameter is connected there again.

Figure 2:
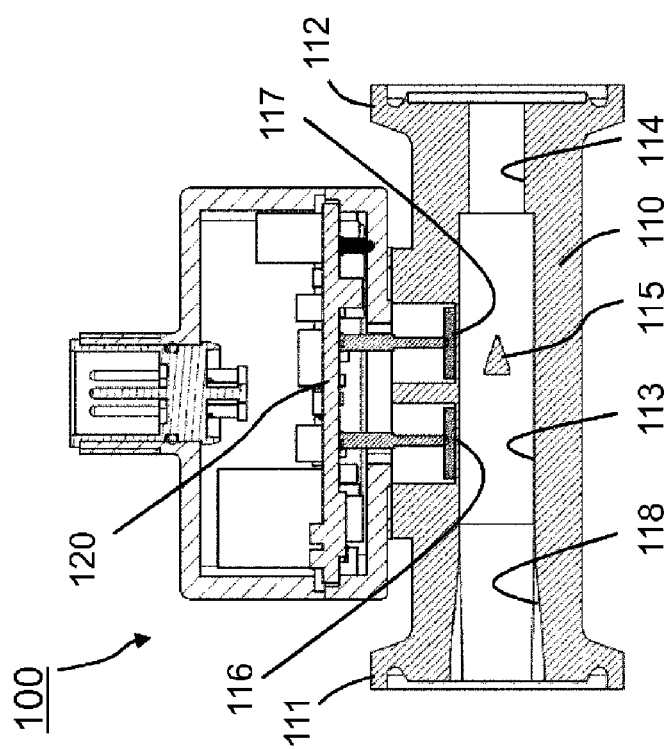
FIG. 2 shows a schematic longitudinal view through a second exemplary embodiment of a flow meter device according to the present disclosure in a side view.

The second exemplary embodiment of a flow meter device 100 according to the invention shown in FIG. 2 comprises a measuring tube 110 with a first flange 111 on the inflow side and a second flange 112 on the outflow side for installation in a pipeline. The measuring tube 110 has a central first cylindrical section 113 having a first inner diameter and a second cylindrical section 114 on the outflow side having a second inner diameter, wherein the transition between the first cylindrical section and the second section is designed as a radial step or radial jump. On the inflow side, a conical section 118 is also connected upstream of the first cylindrical section 113 and reduces the diameter of the measuring tube continuously from a diameter of a pipeline connected on the inflow side to the diameter of the first cylindrical section 113 in order to increase the flow speed of a medium. This reduction in diameter should take place with as little energy loss as possible for the flowing medium. The flow meter device 100 furthermore has a bluff body 115 which is arranged in the first cylindrical section 113 and which extends through the measuring tube perpendicularly to the longitudinal axis of the measuring tube 110 in order to generate a Kármán vortex street an a medium flowing through the measuring tube 110. The measuring tube 110 has two wall regions which are thinned in a membrane-like manner and function as membranes of pressure sensors 116, 117 with electrical transducers, wherein the membranes are influenced differently by the Kármán vortex street. The pressure sensors 116, 117 together form a vortex detector, wherein a fluctuation of the difference between their sensor signals is evaluated by an operating and evaluation circuit 120 in order to determine a vortex frequency and thus the flow rate.

The aforementioned reduction of the diameter between the first cylindrical section 113 and the second cylindrical section 114 achieves a throttling effect which, in a flowing medium, causes the static pressure in the first cylindrical section 113 in the region of the membranes of the pressure sensors 116, 117 to be kept at a higher level than the static pressure in a pipeline which is connected to the measuring tube on the outflow side and has the diameter of the measuring tube on the inflow-side end face. In this way, the static pressure in the region of the membranes of the pressure sensors 116, 117 can still be kept, for example, above the vapor pressure of a component of a medium flowing in the pipe, despite a pressure drop at the bluff body 15 caused by the measuring principle.

Figure 3:
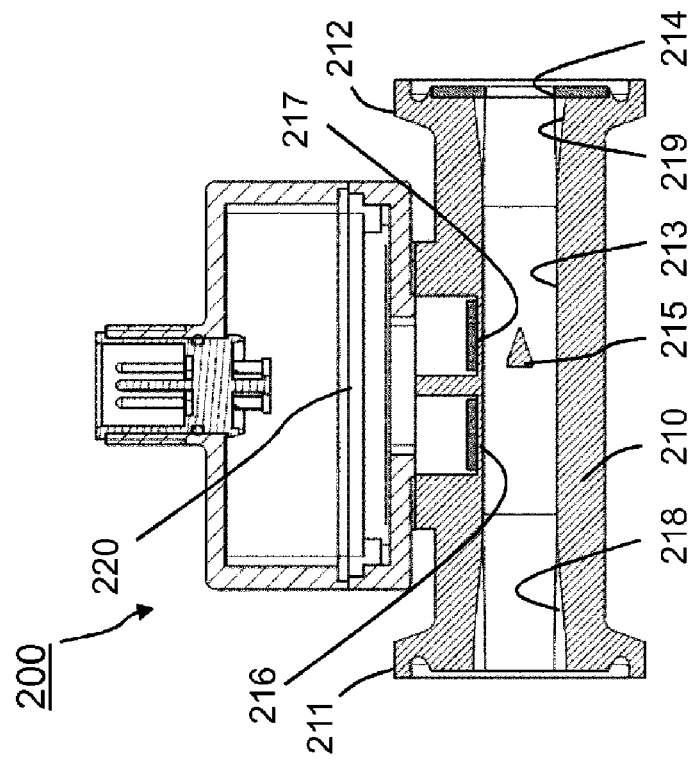
FIG. 3 shows a schematic longitudinal view through a third exemplary embodiment of a flow meter device according to the present disclosure.

The third exemplary embodiment of a flow meter device 200 according to the invention shown in FIG. 3 comprises a measuring tube 210 which a first flange 211 on the inflow side and a second flange 212 on the outflow side for installation in a pipeline. The measuring tube 210 has a central cylindrical section 213 having a first inner diameter. On the inflow side, a conical section 218 is connected upstream of the cylindrical section 213 and reduces the diameter of the measuring tube continuously from a diameter of a pipeline connected on the inflow side to the diameter of the first cylindrical section 213 in order to increase the speed of the flowing medium. On the outflow side, a conical section 219 is also connected downstream of the cylindrical section 213 and continuously increases the diameter of the measuring tube 210 in the direction of the outflow-side end face, wherein the measuring tube 210 has an annular disk-shaped control valve 214 on the outflow-side end face, the inner diameter of which control valve is abruptly reduced relative to the adjacent diameter of the conical section, especially, to the diameter of the central cylindrical section 213.

The flow meter device 200 furthermore has a bluff body 215 which is arranged in the first cylindrical section 213 and extends through the measuring tube perpendicularly to the longitudinal axis of the measuring tube 210 in order to generate a Kármán vortex street an a medium flowing through the measuring tube 210. The measuring tube 210 has two wall regions which are thinned in a membrane-like manner and function as membranes of pressure sensors 216, 217 with electrical transducers, wherein the membranes are influenced differently by the Kármán vortex street. The pressure sensors 216, 217 together form a vortex detector, wherein a fluctuation of the difference between their sensor signals is evaluated by an operating and evaluation circuit 120 in order to determine a vortex frequency and thus the flow rate.

The diameter jump at the annular disk-shaped control valve 214 has the effect that, in a flowing medium, the static pressure in the central cylindrical section 213 in the region of the membranes of the pressure sensors is kept at a higher level than the static pressure in a pipeline which is connected to the measuring tube on the outflow side and has the diameter on the inflow-side end face. In this way, the static pressure at the location of the pressure sensors can still be kept at a higher level, especially, above the vapor pressure of a component of a medium flowing in the pipe, despite a pressure drop at the bluff body 215 caused by the measuring principle.

The invention claimed is:

1. A measuring tube for guiding a fluid within a flow meter device which operates according to the vortex measuring principle, wherein the measuring tube includes an inflow-side opening in an inflow-side end face and an outflow-side opening in an outflow-side end face between which the measuring tube extends in an axial direction, the measuring tube further comprising:
    a bluff body disposed within the measuring tube, the bluff body structured and disposed to generate a Kármán vortex street with a flow-rate-dependent vortex frequency when a fluid flows through the measuring tube;
    at least one vortex detector configured to detect vortexes of the vortex street and to generate vortex-dependent signals; and
    a throttle disposed between the vortex detector and the outflow-side end face and axially spaced apart from the vortex detector, which annularly constricts a flow cross-section of the measuring tube, wherein:
        the measuring tube has a first diameter between the vortex detector and the throttle at a first axial position;
        at a second axial position, the throttle has a second diameter, which is smaller than the first diameter by at least one tenth; and
        a diameter transition between the first diameter and the second diameter is abrupt such that a quotient of a difference between the first diameter and the second diameter and a difference between the first axial position and the second axial position is not less than four.

2. The measuring tube of claim 1, wherein the throttle has a flow resistance which is not less than 50% of a flow resistance of the measuring tube between the inflow-side end face and the vortex detector.

3. The measuring tube of claim 1, wherein the throttle has a flow resistance which is not less than 95% of a flow resistance of the measuring tube between the inflow-side end face and the vortex detector.

4. The measuring tube of claim 1, wherein the throttle has a minimum flow cross-sectional area which is not more than one and a half times a minimum flow cross-sectional area in the region of the bluff body.

5. The measuring tube of claim 1, wherein the throttle has a minimum flow cross-sectional area which is not more than one and one-tenth times a minimum flow cross-sectional area in the region of the bluff body.

6. The measuring tube of claim 1, wherein a diameter transition between the first diameter and the second diameter is configured as a step transition.

7. The measuring tube of claim 1, wherein the throttle is axially spaced from the vortex detector such that an axial distance therebetween is not less than half a diameter of the measuring tube between the vortex detector and the throttle.

8. The measuring tube of claim 1, wherein the throttle is axially spaced from the vortex detector such that an axial distance therebetween is not less than a diameter of the measuring tube between the vortex detector and the throttle.

9. A flow meter device which operates according to the vortex measuring principle, the device comprising:
    a measuring tube including an inflow-side opening in an inflow-side end face and an outflow-side opening in an outflow-side end face between which the measuring tube extends in an axial direction, the measuring tube further comprising:
        a bluff body disposed within the measuring tube, the bluff body structured and disposed to generate a Kármán vortex street with a flow-rate-dependent vortex frequency when a fluid flows through the measuring tube;
        at least one vortex detector configured to detect vortexes of the vortex street and to generate vortex-dependent signals; and
        a throttle disposed between the vortex detector and the outflow-side end face and axially spaced apart from the vortex detector, which annularly constricts a flow cross-section of the measuring tube, wherein:
            the measuring tube has a first diameter between the vortex detector and the throttle at a first axial position;
            at a second axial position, the throttle has a second diameter, which is smaller than the first diameter by at least one tenth; and
            a diameter transition between the first diameter and the second diameter is abrupt such that a quotient of a difference between the first diameter and the second diameter and a difference between the first axial position and the second axial position is not less than four; and an evaluation unit configured to determine a vortex frequency based on the vortex-dependent signals of the vortex detector and to determine a flow rate measurement value as a function of the vortex frequency.

10. A method for measuring the flow rate or the flow speed of a medium with a flow meter device according to the vortex measuring principle, the method comprising:

providing a flow meter device comprising:
- a measuring tube configured to convey a fluid, the measuring tube including an inflow-side opening in an inflow-side end face and an outflow-side opening in an outflow-side end face between which the measuring tube extends in an axial direction;
- a bluff body disposed within the measuring tube and adapted to generate a Kaman vortex street with a flow-rate-dependent vortex frequency when the fluid flows through the measuring tube;
- at least one vortex detector configured to detect vortexes of the vortex street and to provide vortex-dependent signals;
- an operating and evaluation circuit configured to determine a vortex frequency using the signals and a flow rate measurement value using the vortex frequency;
- a throttle disposed between the vortex detector and the outflow-side end face of the measuring tube, which throttle annularly constricts a flow cross-section of the measuring tube, wherein the measuring tube has a first diameter between the vortex detector and the throttle at a first axial position, wherein at a second axial position, the throttle has a second diameter, which is smaller than the first diameter by at least one tenth, and wherein a diameter transition between the first diameter and the second diameter is abrupt such that a quotient of a difference between the first diameter and the second diameter and a difference between the first axial position and the second axial position is not less than four, wherein the measuring tube is structured such that a difference between a first static pressure at the inflow-side end face and a second static pressure at an axial position halfway between the bluff body and the throttle is not more than two thirds a difference between the first static pressure at the inflow-side end face and a third static pressure downstream of the throttle at the outflow-side end face;

determining a vortex frequency based on the signals of the vortex detector; and determining a flow rate measurement value as a function of the vortex frequency.

11. The method of claim 10, wherein the measuring tube is structured such that the difference between the first static pressure and the second static pressure is not more than half the difference between the first static pressure and the third static pressure.

12. The method of claim 10, wherein the medium has a vapor pressure, and wherein the second static pressure is not less than one and a half times the vapor pressure of the medium.

13. The method of claim 10, wherein the difference between the first static pressure and the third static pressure is not less than 20% of the third static pressure.

* * * * *